United States Patent
Klinnert et al.

(10) Patent No.: US 7,109,916 B2
(45) Date of Patent: Sep. 19, 2006

(54) DEVICE FOR, IN PARTICULAR BISTATIC RADAR APPLICATIONS

(75) Inventors: Roland Klinnert, Korntal-Muenchingen (DE); Christian Zott, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/509,345

(22) PCT Filed: Jan. 10, 2003

(86) PCT No.: PCT/DE03/00051

§ 371 (c)(1),
(2), (4) Date: Mar. 18, 2005

(87) PCT Pub. No.: WO03/081278

PCT Pub. Date: Oct. 2, 2003

(65) Prior Publication Data

US 2005/0179586 A1    Aug. 18, 2005

(30) Foreign Application Priority Data

Mar. 27, 2002   (DE) ............................... 102 13 987

(51) Int. Cl.
*G01S 13/10* (2006.01)
*G01S 13/12* (2006.01)
*G01S 13/58* (2006.01)

(52) U.S. Cl. .................. 342/134; 342/59; 342/137; 342/175; 342/194; 342/195

(58) Field of Classification Search .... 342/25 R–25 F, 342/59, 73, 82–103, 118, 134–144, 159–164, 342/175, 195

See application file for complete search history.

(56) References Cited

U.S. PATENT DOCUMENTS 5,604,503 A    2/1997   Fowler et al.
6,614,388 B1 *  9/2003  Klinnert et al. ............. 342/135

FOREIGN PATENT DOCUMENTS

EP         0 446 678        9/1991

OTHER PUBLICATIONS

* Dorey, J. et al.: "RIAS, Radar, à Impulsion et Antenne Synthétique" Onde Electrique, Editions Chiron S.A. Paris, Fr., Bd. 69, Nr. 6, Nov. 1, 1989, pp. 36-44.

* cited by examiner

Primary Examiner—Bernarr E. Gregory
(74) Attorney, Agent, or Firm—Kenyon & Kenyon LLP

(57) ABSTRACT

In a device for bistatic radar applications, at least two spaced-apart radar sensors having separate carrier-frequency oscillators are provided, which do not require phase synchronization. The pulse modulation is carried out time-synchronously for all transmitter and receiver pairs. The cross-echo signals can be analyzed in an analyzing unit, in which a mixing of the transmitted and received signals takes place.

19 Claims, 3 Drawing Sheets

DEVICE FOR, IN PARTICULAR BISTATIC RADAR APPLICATIONS

FIELD OF THE INVENTION

The present invention is directed to a device for bistatic radar applications.

BACKGROUND INFORMATION

The fundamental operation of pulsed radars for measuring the distance and velocity of objects had already been described in 1938 by Col. William Blair of the U.S. Signal Corps. When a microwave carrier undergoes pulse modulation, a signal of a defined pulse duration Tp is periodically transmitted at the pulse repetition frequency PRF. The signal reflected off of an object is attenuated in the receiver to the baseband range. By analyzing the baseband signal, the signal propagation time T and possibly the signal Doppler shift $f_D$ are determined. From the propagation time T, the object-sensor slant distance R is derived, ultimately based on the speed of light c, from the relationship $R=c \cdot T/2$, and the object velocity v is determined, with the carrier frequency being $f_C$, from the relationship $v=c/2 \cdot f_D/f_C$.

Conventional pulsed radar systems use the following operating modes:

LPRF (Low Pulse Repetition Frequency):

In this case, pulsed radars have such a low pulse repetition frequency PRF, that a unique measurement up to the greatest desired object distance is always possible. However, if velocities occur that can result in $f_D$ being greater than PRF/2, the velocity determination is no longer unique.

HPRF (High Pulse Repetition Frequency):

Here, operation takes place at such a high pulse repetition frequency that the velocity determination in the entire relative velocity range is always unique. The distance measurement is only unique when all objects in the detecting range exclusively have smaller distances than c/(2 PRF) to the sensors.

PRF Staggering (Staggered PRF):

To avoid so-called blind speeds which occur at constant pulse repetition frequency, or to flatten the line spectrum of the transmitted signal that exists given a constant pulse repetition frequency, e.g., for improved interference suppression, pulse pause intervals of variable length (variable interpulse period VIP) are also used.

Coherent Mixing:

To attenuate the received signal to the baseband range, it is customary for the receiver to mix the received signal with a copy of the transmitted signal. Given a spatial proximity of the transmitter and receiver, the copy can be possibly derived from the same oscillator as the transmitted signal or from a second oscillator of the receiver's own. Depending on whether a stochastic relationship exists from pulse to pulse, among the phases of the received signal and its copy, one speaks of incoherent or coherent mixing. The coherent mixing affords a precise Doppler or velocity determination. However, to achieve the desired coherence, considerable outlay must be expended to synchronize the phases (e.g., use of lock-pulse methods or digital detectors of the transmission phase). Incoherent methods are usually called for when no velocity measurement or only an imprecise velocity measurement is required.

Monostatic, Bistatic:

If the transmitting and receiving antennas are "distinctly" spatially distant from one another, and if the transmitted signal and its copy are derived from different oscillators for mixing purposes, one usually speaks of bistatic radar systems, in contrast to monostatic radar systems.

Pulse Compressions:

For a pulsed radar to achieve a minimal coverage range, a minimum of total energy is required which must be reflected off of an object and integrated by the receiver. Given a predefined pulse repetition frequency, limited peak power output of the transmitter, and limited permissible integration time, the energy can only be still increased by prolonging the pulse duration. On the other hand, the correlation duration (width of the autocorrelation function) of a pulse determines the attainable resolution of a pulsed radar. By using internal pulse modulation/coding, also referred to as pulse compression methods, the correlation duration (the resolution) and pulse duration (energy and average power output and, thus, instrumented coverage range) can be theoretically defined independently of one another. Customary compression methods are linear or non-linear frequency modulation, as well as biphase or multiphase modulation.

It is known that varying combinations and hybrid forms of the above mentioned methods are used.

Fields of Application of Pulsed Radars:

Monostatic Pulsed Radars:

In military applications and in civilian air-traffic control, e.g., monostatic pulsed radars having substantial transmitting power and antenna directivity (beam focusing) are often used for measuring great distances and, to some extent, high velocities. Frequently, a range and azimuth scan is carried out, as well as a relatively complex Doppler processing (MTI (moving target indication), MTD (moving target detection) process), as well as, typically, pulse coding/pulse compression, e.g., chirp (dynamic wavelength change) and modulation of the pulse repetition frequency (VIP (variable interpulse period), staggered PRF (pulse repetition frequency)).

Bistatic Pulsed Radars:

Bistatic pulsed radars are found in military applications, in astronomy and in meteorology, where the object distances are large and are accompanied by great transmitter and receiver distances (for example, baselines in the range of hundreds of kilometers). High demands are typically placed on the components of such bistatic radars, particularly due to the requisite time synchronization of the sensors (pulse synchronization for distance measurement, phase synchronization for velocity measurement (Doppler)) over large spatial distances. Also regarded as difficult are the required synchronized alignment of the viewing directions and, in some instances, allowance for platform movements.

Low-cost Pulsed Radars:

Microwave pulsed radars are increasingly being used in applications where objects are detected at small distances, using low transmitting power and a wide visual range, and where, additionally, low costs are required, such as for door openers, room surveillance, detection of motor-vehicle surrounding fields. Often used in this context are monostatic LPRF (low pulse repetition frequency) methods, incoherent mixing, no pulse compression, or possibly pulse compression including biphase modulation. In contrast to military radar systems or air-traffic control radars, for the low-cost pulsed radars, high-quality components are rarely used. Rather, oscillators having low frequency stability, mixers and LNAs (low-noise amplifiers) having low bandwidth and high noise factor are used, for example.

SUMMARY

The present invention renders possible a cross-echo detection and distance measurement when working with bistatic pulsed radars, i.e., with spatially separate transmitting and receiving antennas and carrier frequency oscillators, it being possible for both carrier frequency oscillators of any one transmitter/receiver pair, in contrast to conventional bistatic systems, to be run in asynchronous operation, i.e., they do not necessarily have to be frequency-synchronized or phase-synchronized.

The device according to the present invention is distinguished from customary bistatic radar applications, in particular by a time-synchronized pulse modulation when working with transmitting and receiving sensors.

The present invention may be advantageously applied in connection with a pulse repetition frequency that is selected in accordance with the low pulse repetition frequency method, in particular a pulse repetition frequency that is selected to be only slowly changeable over time or piecewise constant over time.

It is thus possible to implement a bistatic pulsed radar in the low cost range as well, using low transmitting power to measure small cross-echo distances (given small baselines), and components that are not of high quality. In pulsed-radar arrays, it may be used to simultaneously measure direct and cross-echo distances. The additional cross-echo distances increase the spatial sampling of the sensor surroundings, may be used for classifying object contours, and enhance the redundancy of the sensor information.

The time-synchronous pulse modulation of the carriers of adjacent sensors and mixing of transmitted and received signals result in "image signals" having frequency components below half of the pulse repetition frequency PRF. These are referred to in the following as "cross-echo Dopplers". The mid-frequency of such a cross-echo Doppler may be adjusted via the pulse repetition frequency PRF. The power of the cross-echo Doppler supplies a continuous low-frequency signal, thereby rendering possible cross-echo detection and distance measuring.

In addition to the described implementation, a pulse compression may be carried out. A pulse jitter is likewise possible, provided that it is produced in such a way that it is synchronous for both sensors, and that the cross-echo Doppler is still sufficiently band-limited with respect to the downstream analyzing unit.

DETAILED DESCRIPTION

Figure 1:
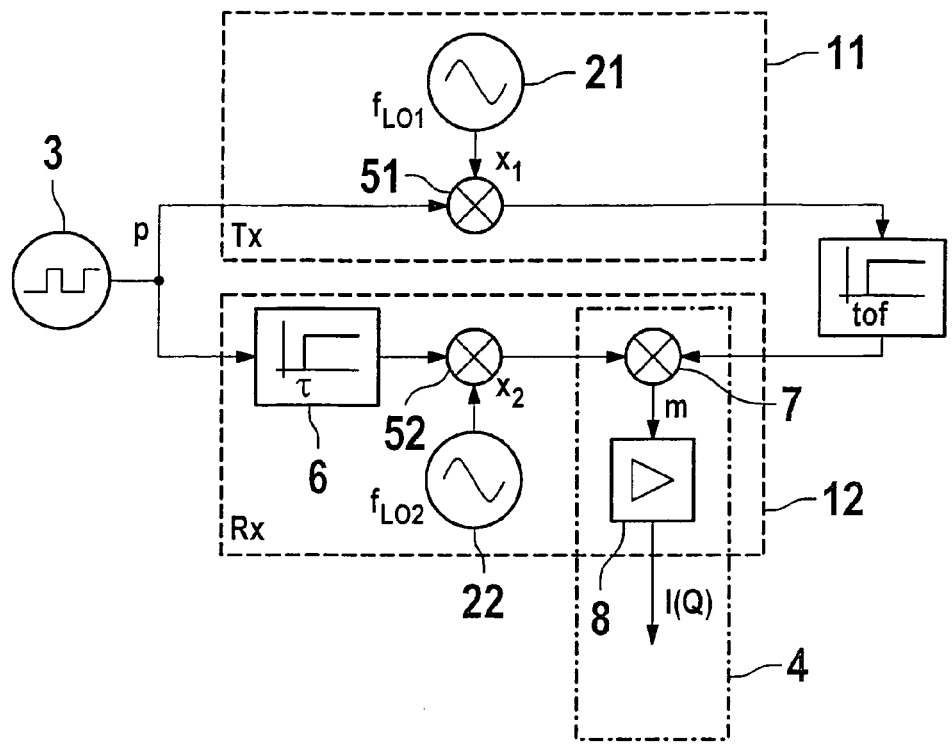
FIG. 1 shows a time-synchronously controlled pulsed-radar transmitter/receiver pair.

FIG. 1 shows two pulsed-radar sensors 11, 12, of which top sensor 11 functions as transmitter (Tx), bottom sensor 12 functions as receiver (Rx). Using their respective carrier-frequency oscillators 21, 22, the sensors generate carrier signals $x_1$ and $x_2$ having individual carrier frequencies $f_{LO1}$ and $f_{LO2}$. These carrier signals are modulated by the same pulsed source 3 using the 0–1 pulse sequence p, i.e., via modulators 51, 52, pulses are impressed on the output signals of the carrier-frequency oscillators. A separate pulsed signal source 3 may also be assigned to each of sensors 11, 12. However, this requires synchronizing these pulsed signal sources among one another. This may be accomplished either by using a connecting lead, or otherwise by recovering the transmitter pulse repetition frequency from the received signal and compensating for the phase offset. The phase offset may be determined by utilizing redundancy, since, due to the reversibility of signal paths (S11↔S12), two cross-echo measurements of an object are normally available, as are possibly existing self-generated-echo measurements of an object. For example, assuming: Δ=phase lead angle from pulsed signal source 1 to pulsed signal source 2; tofK=cross-echo propagation time from S11 to object K to S12 or return direction=cross-echo measurement from S11 to S12 relative to pulsed signal source 2; tofK21=cross-echo measurement from S12 to S11 pulsed signal source 1; it then holds that tofK=tofK–Δ and tofK=tofK21+Δ→Δ=(tofK12–tofK21)/2→tofK=(tofK12+tofK21)/2. The signal radiated by the transmitter, once reflected off of an object and subsequently to propagation time (time-of-flight tof), is received by the receiver. Using a delay circuit/delay line 6, the receiver delays pulse sequence p by delay time τ. If adjusted delay τ corresponds to propagation time tof, then in the case that τ=tof, signal $m=p \cdot x_1 \cdot x_2$ results at the output of mixer 7, to which, depending on the time-synchronous pulse modulation, a transmitted signal, on the one hand, and, a received signal, on the other hand, may be supplied.

This (ideal) mixed signal is itself low-pass filtered, for example, in an analyzing unit 4 having a downstream real amplifier 8 and mixer 7. The I-signal is then available at the output of the amplifier or of the impedance converter and, in the case of a second mixer which works with the 90° phase-offset carrier, also a Q-signal, for further low-frequency signal processing. The following describes the spectrum that results for the I(Q)-signal.

Figure 2:
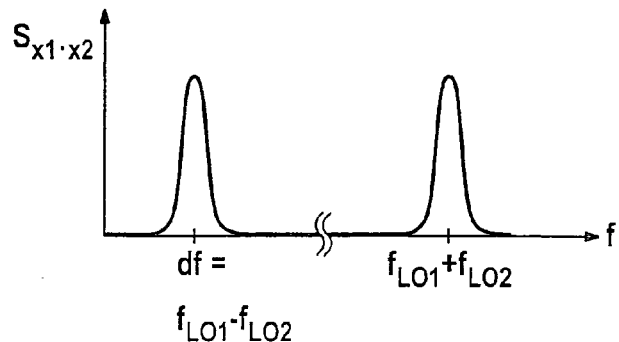
FIG. 2 shows a power density spectrum of the mixed, non-pulsed carriers of adjacent sensors.

1. The mixture (multiplication) of the non-pulsed carriers, e.g., $x_1$ and $x_2$ in FIG. 1, of two adjacent sensors having average differential frequency $df=f_{LO1}-f_{LO2}$, would produce a spectrum having band-limited components of around $df=f_{LO1}-f_{LO2}$ and $f_{LO1}+f_{LO2}$ (FIG. 2). The summed component may be disregarded due to the low-pass characteristics of mixer 7 and amplifier 8. The width of the remaining spectral component around df is determined by the short-term frequency stability of the carrier-frequency oscillators during the pulse integration time. It is important that such a band-limited spectrum also be produced when working with oscillators that are not frequency- or phase-synchronized.

Figure 3:
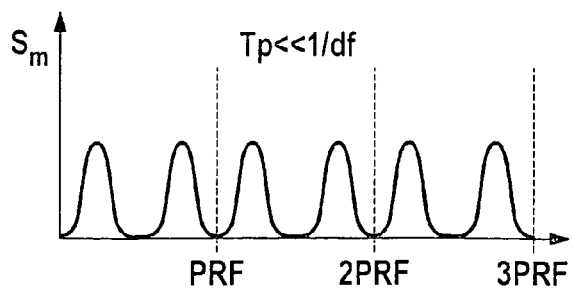
FIG. 3 shows a power density spectrum of the mixed, pulsed carriers of adjacent sensors, given a negligible pulse duration.
Figure 4:
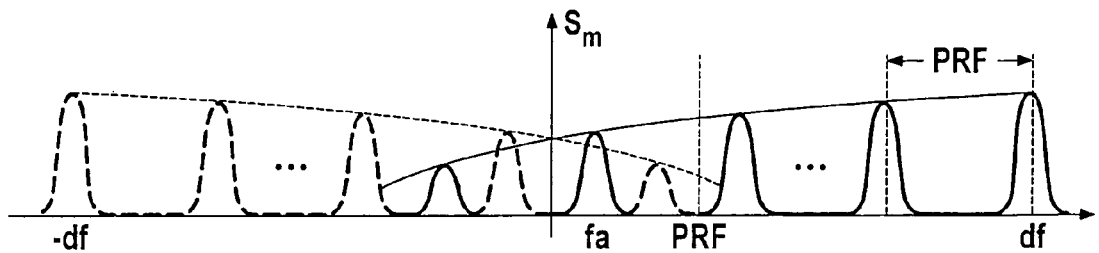
FIG. 4 shows the power density spectrum of the mixed, pulsed carriers of adjacent sensors, given a not insignificant pulse duration.

2. The pulse modulation of product $x_1 \cdot x_2$, which ultimately leads to ideal mixed signal m, corresponds to a sampling, the sampling frequency being given by adjusted pulse repetition frequency PRF of the pulse generator. However, in the spectrum, an ideal sampling (δ sampling) leads to a periodic continuation of the spectrum of the sampled signal. Thus, the spectrum distributed around df is mirrored twice into each of frequency intervals [z·PRF, (z+1)·PRF], z being an integral number (FIG. 3). It should be noted that a band-limited signal is always formed in the frequency range [0, PFR/2], thus even given differential frequency df, which is substantially greater than pulse repetition frequency PRF (thus given subsampling). In this context, mid-frequency fa of the "image signal" in [0, PFR/2] and differential frequency df are interrelated, as expressed by the equation $$df = n \cdot PRF +- fa \quad (1)$$

n being $\in N_O$ (an integral submultiple between df and PRF). An ideal sampling is provided when the pulse duration is very short as compared to the shortest period duration of the sampled signal, i.e., Tp<<1/df. If this is not the case, the amplitudes of the repeated spectral components fall off in accordance with an envelope defined by the pulse shape and the not insignificant pulse duration (FIG. 4). In the case of a square-wave pulse of length Tp, the envelope is, for example, a sinx/x characteristic having the first zero position at 1/Tp.

Figure 5:
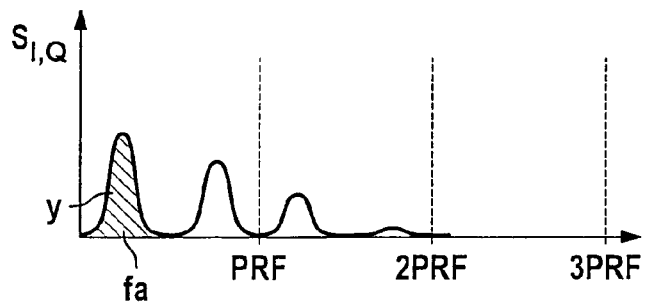
FIG. 5 shows the power density spectrum of a real I(Q) (in-phase and quadrature) signal during cross-echo reception.

3. The spectrum of the real IQ-signal falls off markedly above the limiting frequencies of the mixer and amplifier/impedance converter, which are typically substantially lower than differential frequency df and generally resemble a characteristic shown in FIG. 5. This limited signal component, formed by a cross echo in the I(Q)-signal and having its essential frequency components below PRF/2, is referred to in the following discussion as cross-echo Doppler. A direct echo of an extremely rapidly moving object having corresponding Doppler frequencies around $f_D$=df would lead to a similar signal.

4. It should be noted that image frequency fa of the cross-echo Doppler having predefinable pulse repetition frequency PRF (given a slowly changeable time frequency df) in accordance with the above equation (1) may be adjusted to a desired value. In particular, by selectively setting the pulse repetition frequency, it is possible to ensure, on the one hand, that image frequency fa is always below the limiting frequency of the mixer and amplifier. On the other hand, given parallel reception of direct echoes of the sensor, it is possible to ensure that image frequency fa is always above maximum Doppler frequency $f_{Dmax}$. This may be understood as a "frequency-multiplexing" use of the I(Q)-signal, where the direct echoes and cross echoes are in separate frequency ranges.

An important condition for a distinct separation is that the local mixing oscillators be short-term frequency-stable to such an extent that the bandwidth of $x_1 \cdot x_2$ is always smaller than PRF/2–$f_{Dmax}$.

5. Submultiple n and image frequency fa characterize the momentary differential frequency of a sensor pair for which cross-echo reception exists. Thus, when working with sensor arrays having more than two sensors, where the differential frequencies of all relevant sensor pairs deviate significantly from one another, a transmitter identification is also possible given a parallel reception of a plurality of cross echoes.

The device according to the present invention provides, for example, the following features:
  synchronous pulsed driving (connecting lead, or by recovering the transmitter pulse repetition frequency from the received signal and compensating for the phase offset);
  using the cross-echo Doppler in I, Q-signals or in signals derived therefrom, below PRF/2;
  control/regulation of mid-frequency fa of the cross-echo Doppler by changing the pulse repetition frequency.

Figure 6:
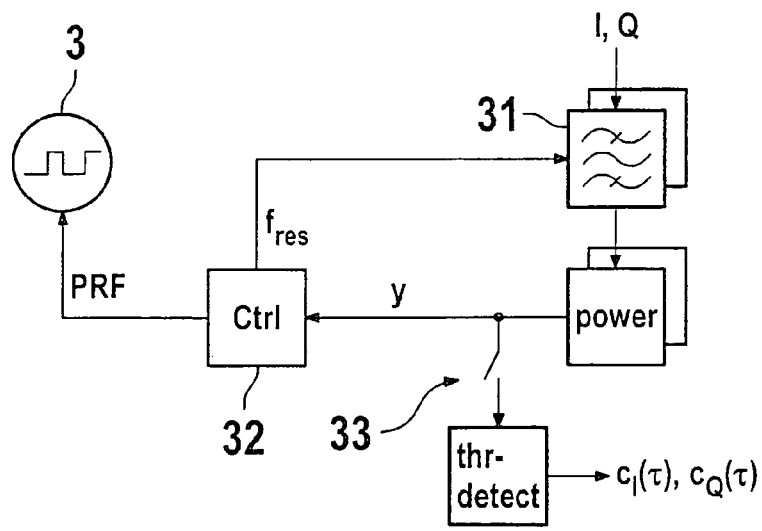
FIG. 6 shows a cross-echo Doppler control and analysis in one embodiment of the present invention entailing little cost outlay.

From the above-described features, the following advantages are provided, for example:
  power measurement (or the like, e.g., amplitude, quasi peak, etc.) of the cross-echo Doppler supplies a continuous low-frequency signal for cross-echo detection and cross-echo distance measuring;
  for digital processing, cost-effective sampling of the low-frequency power signal possible, using low sampling rates (determined by object-sensor dynamics and scan rate);
  cross echoes may be analyzed in parallel to direct echoes, since the cross-echo Doppler in the I, Q-signal is placed with the pulse repetition frequency in a separate frequency range (frequency-multiplexing operation);
  a costly phase synchronization of the carriers is not necessary, but a minimum short-term frequency stability (during the pulse integration time) of the possibly free-running oscillators is required;
  no high demands on the bandwidth of the mixers and low-frequency amplifiers (above selectable image frequency fa);
  the mid-frequency of the cross-echo Doppler may be kept constant via the pulse repetition frequency, e.g., in the case of a drifting carrier-frequency differential (response to temperature changes, etc.);
  active suppression of otherwise sporadically occurring crosstalk, which occurs in sensor arrays in response to unsynchronized operation using a fixed pulse repetition frequency when the cross-echo Doppler, e.g., due to temperature drift of the carrier frequencies, happens to fall within the frequency range of the direct echoes (0 . . . $f_D$);
  indirect monitoring of the carrier frequencies as diagnostic function (built-in test);
  in sensor arrays, a cross-echo transmitter identification is possible by estimating the carrier-frequency differential on the basis of identified cross-echo Doppler mid-frequency fa, the pulse repetition frequency, and integral submultiple n of the quotient of df and PRF;
  customary pulse-compression methods may be used; and
  cost-effective hardware implementation is possible, e.g., variant of an embodiment entailing little outlay in accordance with FIG. 6, i.e., controllable PRF generator having PLL/DDS, analog bandpass BP and power measurement/half-wave (one-way) rectifier.

An example embodiment of the device according to the present invention has the following requirements:
  synchronous pulsed driving is necessary (connecting lead, or by recovering the transmitter pulse repetition frequency from the received signal and compensating for the phase offset using redundant measurements);
  for the fa control, the pulse repetition frequency must be modifiable in small steps. Thus, the steps must be all the smaller, the greater the ratio df/PRF is, and the smaller the bandwidth of a bandpass is selected;

in the sensor arrays, for each adjacent sensor and I(Q)-signal, the power of the cross-echo Doppler must be determined.

Different embodiments of the present invention are described in the following sections.

It is assumed that all example variants of the present invention use customary pulse-radar heads in accordance with FIG. 1, i.e., each transmitter includes at least one carrier-frequency oscillator and modulator (or fast-action switch) for pulse modulation; each receiver includes at least one pulse-delay unit, one carrier-frequency oscillator, one modulator (or fast-action switch) for pulse modulation, and one mixer for attenuating the received signal (FIG. 1). In a sensor array, each sensor may be composed of a transmitter and receiver having only one carrier-frequency oscillator, which feeds the transmitter and receiver in parallel.

Thus, the device according to the present invention does not require any modification of customary radar heads, as used for monostatic operation, as well. All embodiments of the present invention have in common a pulse-synchronous driving of all sensors, i.e., of all transmitters and receivers, and a frequency-selective analysis of the I-signals and optionally of the Q-signals. The embodiments only exhibit differences in the signal processing of the I(Q)-signals.

Embodiment Entailing Little Outlay (FIG. 6):

I- and optionally Q-signals are filtered by analog bandpass filters 31 using constant resonant frequency $f_{res}$. In this context, using the pulse repetition frequency, an analog or digital control 32 of mid-frequency fa of the cross-echo Doppler ensures that, in the case of cross-echo reception, maximum power output is always available in the pass range of the bandpass filters. Power estimation y of the cross-echo Doppler is carried out by analog analysis of the bandpass output signal, e.g., simple rectification (half-wave rectifier/square-law detector) and smoothing. For digital further processing (detection, distance determination, e.g., by scan operation, see detector outputs $c_I(\tau)$, $c_Q(\tau)$), a sampling 33 of signal (y) at a low rate is possible.

Figure 7:
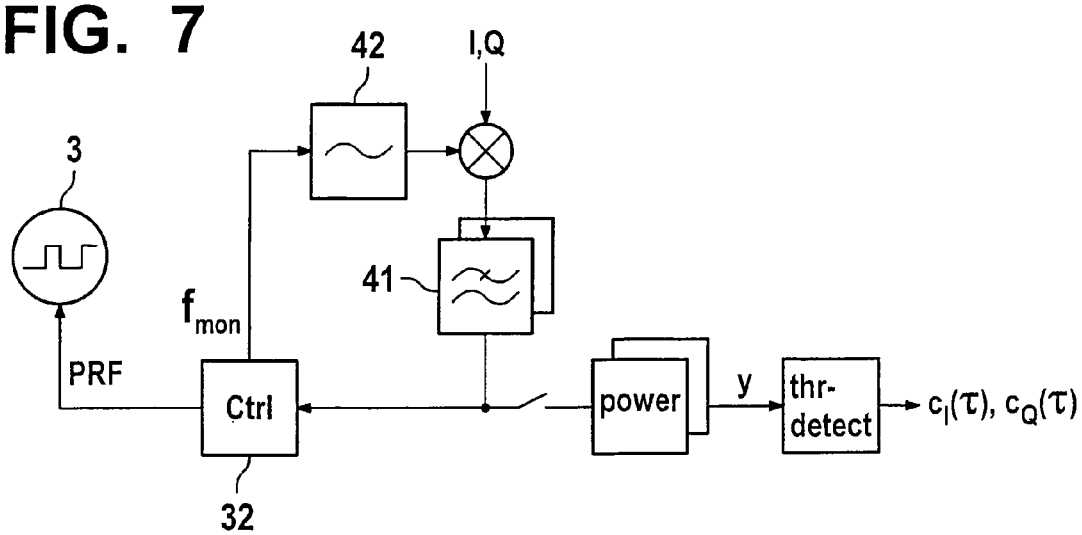
FIG. 7 shows a cross-echo Doppler control and analysis in one embodiment of the present invention entailing medium cost outlay (spectrum analyzer principle).

Embodiment Entailing Medium Outlay (FIG. 7):

Spectrum analyzer principle: I- and optionally Q-signals are mixed (multiplied) with sinusoidal signals by oscillators 42 tuned to a monitoring frequency $f_{mon}$, e.g., direct digital synthesizer DDS. If mid-frequency fa of the cross-echo Doppler is close to $f_{mon}$, a low-pass signal is formed, whose power output, subsequent to low-pass filtering 41, may be estimated analogly or digitally, and analyzed as in the variant entailing little outlay. The advantage of this embodiment is that mid-frequency fa does not need to be kept constant, rather that $f_{mon}$ may follow fa. In addition, the entire spectrum from 0 . . . PRF/2 may be monitored for external interference. Moreover, a sampling of a low-pass signal at a low rate is already possible, and thus a narrow digital low-pass filtering and very precise determination of power output.

Figure 8:
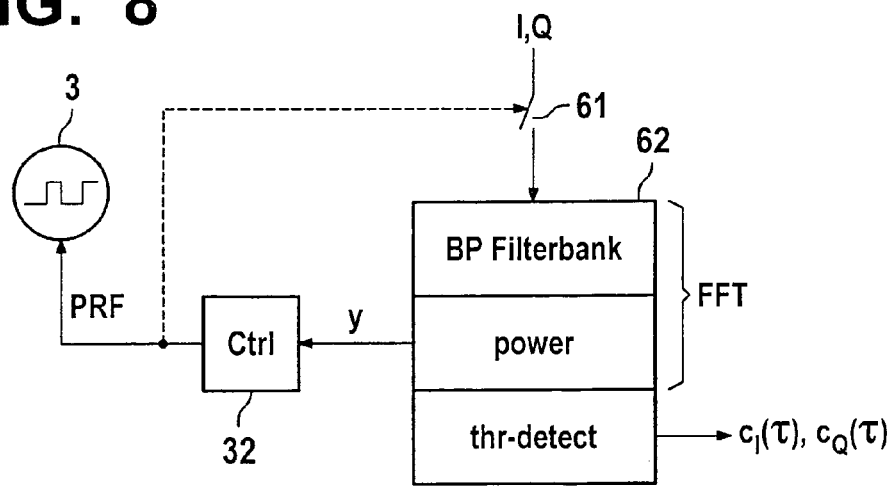
FIG. 8 shows a cross-echo Doppler control and analysis in one embodiment of the present invention entailing substantial cost outlay (MTD (moving target detection) principle).

Embodiment Entailing Greater Outlay (FIG. 8):

I- and optionally Q-signals are sampled 61 pulse-synchronously, i.e., at a rate that is equal to the momentary pulse repetition frequency. A digital filtering by a bandpass filter bank then follows, compare Doppler filter banks typical of MTP radars 62, and a digital power output estimation. This corresponds to an estimation of the I-, Q-power density spectrum in sub-ranges or to the entire spectrum, from 0 . . . PRF/2. To this end, a numerically efficient FFT (fast Fourier transform) may also be used. The advantage of this embodiment is that the power output and mid-frequency of a cross-echo Doppler may be determined very reliably from the spectrum, even when, initially, there may be no past information available on the mid-frequency (capture or scan mode). There is maximum flexibility with regard to the (digital) fa specification/control. In addition, a reliable detection of interference signals is possible. In sensor arrays, the cross-echo Dopplers of all adjacent sensors may be monitored simultaneously.

Figure 9:
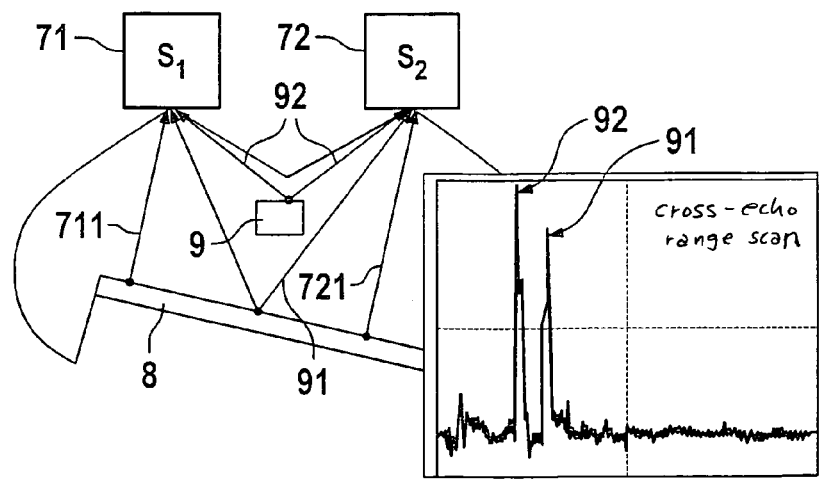
FIG. 9 shows two transmitting and receiving sensors, including representation of the direct echoes and Doppler cross-echoes, as well as of the cross-echo range scan.

FIG. 9 illustrates two spaced-apart radar sensors 71 and 72, which are each equipped for transmitting and receiving operation. The direct echoes are denoted by 711 and 721. They are reflected off of wall 8. Object 9 in the nearfield of the radar sensors cannot be detected by these direct echoes. Detection may only be carried out via cross echo 92. Cross echo 91 is reflected off of wall 8. In the cross-echo range scan likewise depicted in FIG. 9, cross-echo Doppler 92 first appears, conditionally upon the shorter propagation time. Cross-echo Doppler 91 appears with a delay that is dependent on the propagation time. The analysis of the cross-echo Doppler enhances the spatial sampling in the short range (angular resolution), permits the classification of object contours, and increases redundancy, particularly in the distant range. Hence, on the basis of the two measured values of direct echoes 711 and 721 and of cross echo 91, it is possible to verify that object 8 is actually one contiguous reflection surface. If direct echoes 711 and 721 were to arrive, but not cross echo 91, then it could be a matter of two different objects in the distant range. It should be noted, however, that given a larger object 9, cross echo 91 could be blocked by wall 8. To increase the reliability of redundancy and detection, a cross-echo analysis of more than two radar sensors (sensor array) is advantageous.

The invention claimed is:

1. A bistatic radar device, comprising:
at least two spaced-apart bistatic radar sensors assigned to one another for performing at least one of a transmitting operation and a receiving operation;
an independent, asynchronous carrier-frequency oscillator and a modulator assigned to each one of the at least two radar sensors for impressing pulses generated by at least one pulse-signal source onto an output signal emitted by at least one of the carrier-frequency oscillators;
an analyzing unit for a cross-echo Doppler signal, the analyzing unit having a mixing device, at least one of transmitted and received signals being provided as an output signal of the mixing device; and
an arrangement for providing a time-synchronous control of the pulses for the at least two radar sensors.

2. The device as recited in claim 1, wherein a single common pulse-signal source is provided for the at least two radar sensors assigned to one another.

3. The device as recited in claim 1, wherein the time-synchronous control of the pulses is determined by recovering the transmitter pulse repetition frequency, and by compensating for a phase offset on the basis of at least one of the redundant cross-echo measurements and self-generated-echo measurements.

4. The device as recited in claim 1, further comprising:
a delay circuit for the time-synchronous control in a signal path between the at least one pulse-signal source and a modulator of one of the two radar sensors, the delay circuit being configured to be adjusted to effect a signal delay of the pulses of the pulse-signal source in accordance with a propagation time of radiated radar pulses, until subsequent reception of reflected radar pulses from an object.

5. The device as recited in claim 1, wherein at least one of the transmitted signal, an assigned direct-echo Doppler signal, and cross-echo Doppler signal is supplied to the mixing device.

6. The device as recited in claim 1, wherein the analyzing unit is adapted to analyze components of the cross-echo Doppler signal that lie at frequencies below a pulse repetition frequency.

7. The device as recited in claim 1, wherein the analyzing unit is adapted to perform an analog power estimation of the cross-echo Doppler signal.

8. The device as recited in claim 7, wherein for analog power estimation of the cross-echo Doppler signal, at least one bandpass filter is provided, and wherein the analog power estimation includes power estimation of an output of the bandpass filter.

9. The device as recited in claim 7, wherein the analog power estimation of the cross-echo Doppler signal is performed by mixing with a tunable sinusoidal signal and subsequent low-pass filtering.

10. The device as recited in claim 7, further comprising:
an arrangement for sampling at least one of I-received signal and Q-received signal using the pulse repetition frequency; and
an arrangement for at least one of digital filtering, frequency analysis, and power estimation of the cross-echo Doppler signal.

11. The device as recited in claim 1, further comprising:
an arrangement for one of continuously and intermittently regulating the mid-frequency of the cross-echo Doppler signal by changing a pulse repetition frequency.

12. The device as recited in claim 11, wherein the mid-frequency of the cross-echo Doppler signal is regulated on the basis of at least one of a power estimation and frequency estimation of the cross-echo Doppler signal.

13. The device as recited in claim 11, wherein, in addition to the regulation of the mid-frequency of the cross-echo Doppler signal, a search is performed for at least one of the first and repeated tracing of the mid-frequency of the cross-echo Doppler signal.

14. The device as recited in claim 11, wherein the mid-frequency of the cross-echo Doppler signal is regulated in such a way to enable a simultaneous analysis of self-generated echoes and cross-echoes.

15. The device as recited in claim 11, wherein the mid-frequency of the cross-echo Doppler signal is regulated in such a way that suppresses a cross feed of cross echoes into the Doppler frequency range of self-generated echoes.

16. The device as recited in claim 1, wherein the cross-echo Doppler signal is provided for monitoring carrier frequencies of the carrier-frequency oscillators as a diagnostic function.

17. The device as recited in claim 1, wherein a cross-echo transmitter identification is provided on the basis of estimated carrier-frequency differentials, the estimated carrier-frequency differentials being based on estimations of active cross-echo Doppler mid-frequency, estimations of an integral submultiple of a quotient of a carrier-frequency differential and pulse repetition frequency, and an active pulse repetition frequency.

18. The method as recited in claim 17, wherein pulse compression and intra-pulse coding are additionally used for enhancing at least one of interference immunity and transmitter identification.

19. The method as recited in claim 1, wherein a synchronous pulse jitter is additionally used for both radar sensors.

* * * * *